May 7, 1957  R. W. KURTZ  2,790,997
CASTING APPARATUS
Filed June 23, 1952  5 Sheets-Sheet 1
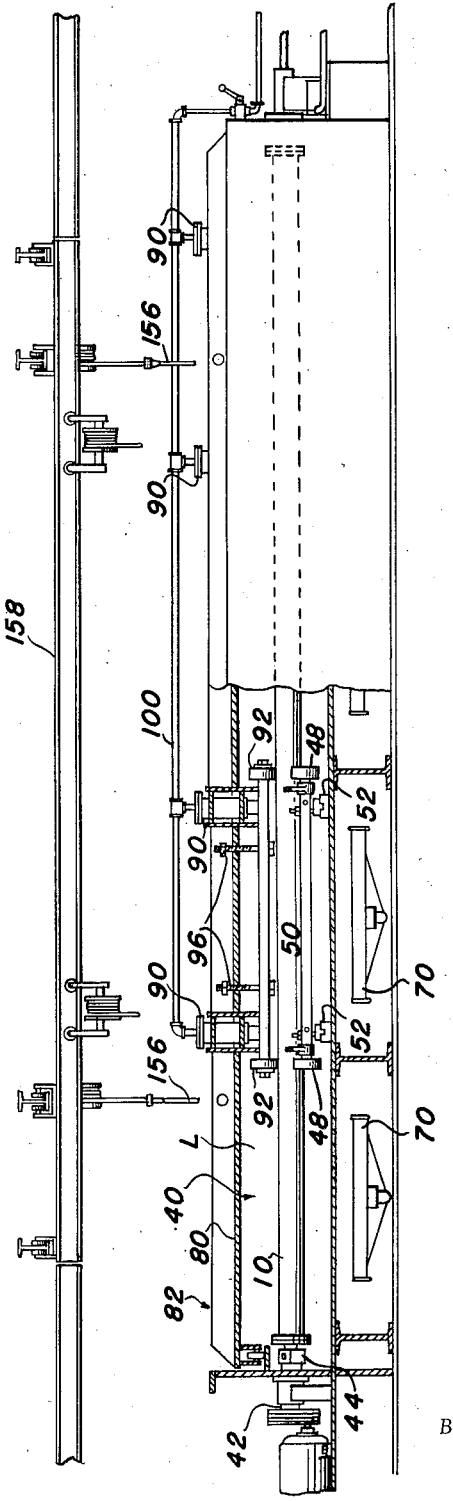
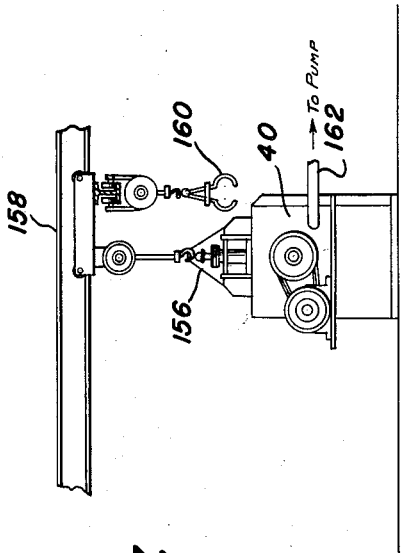
INVENTOR
Ralph W. Kurtz
BY Cushman, Darby & Cushman
ATTORNEYS

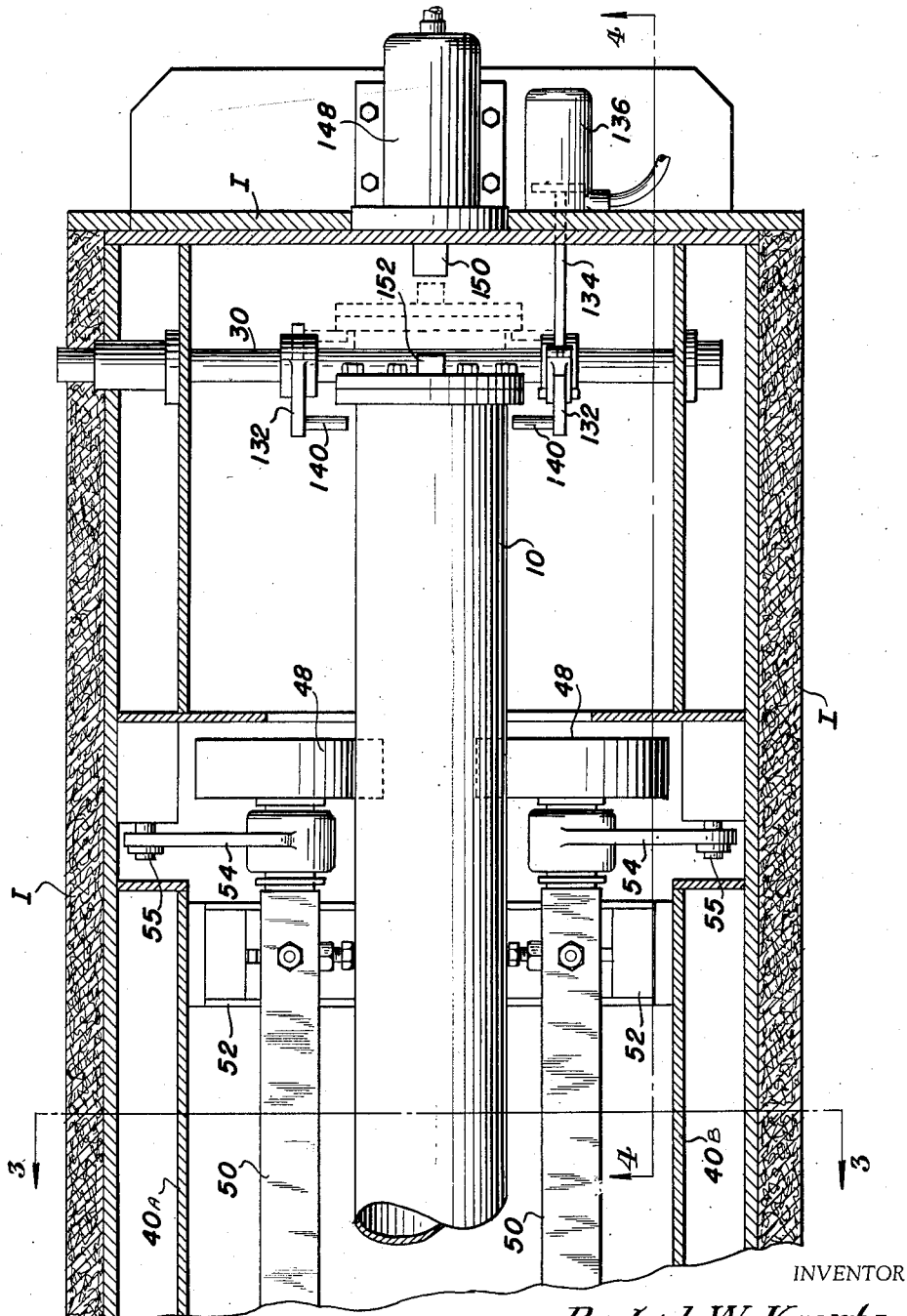

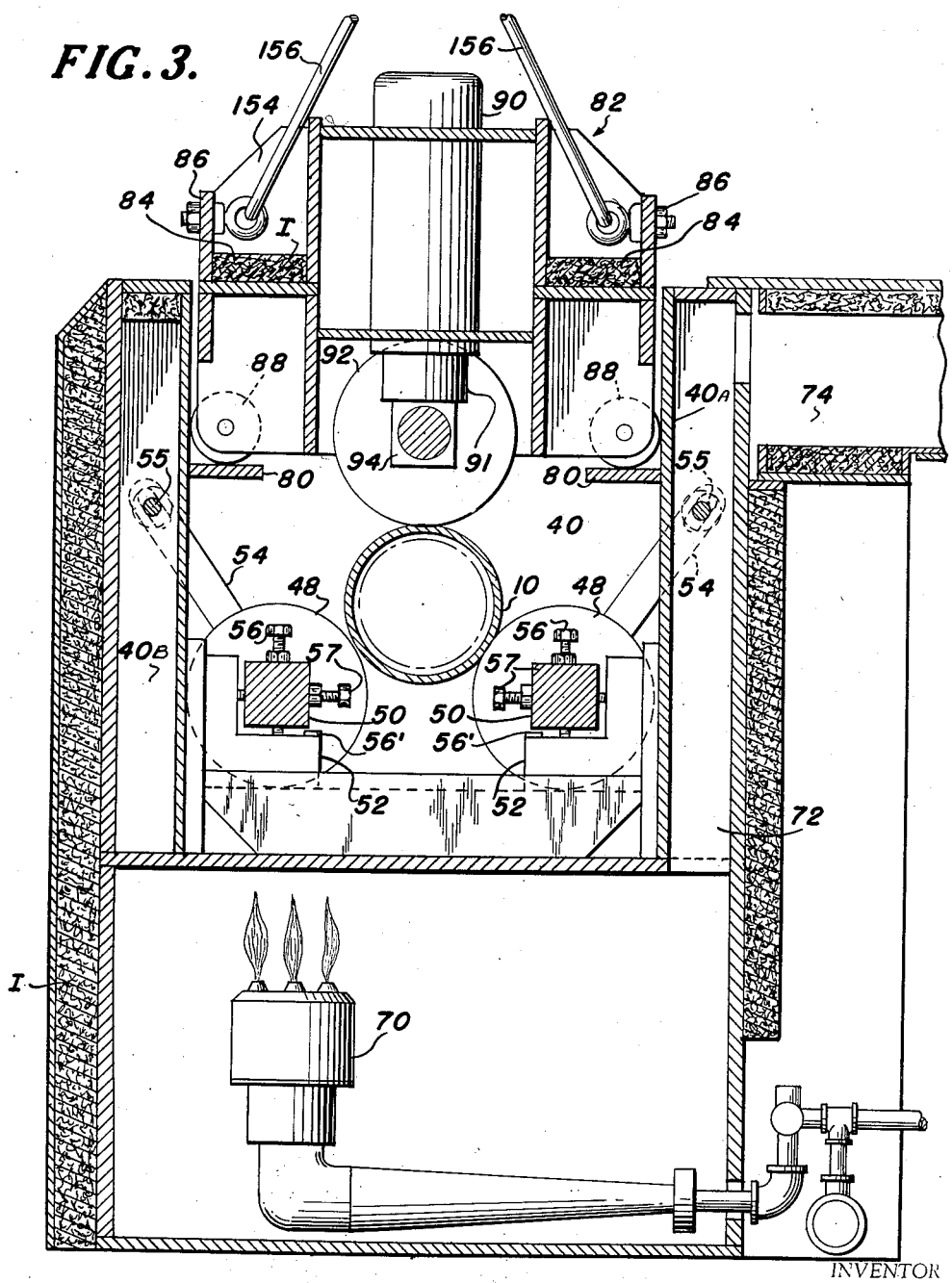

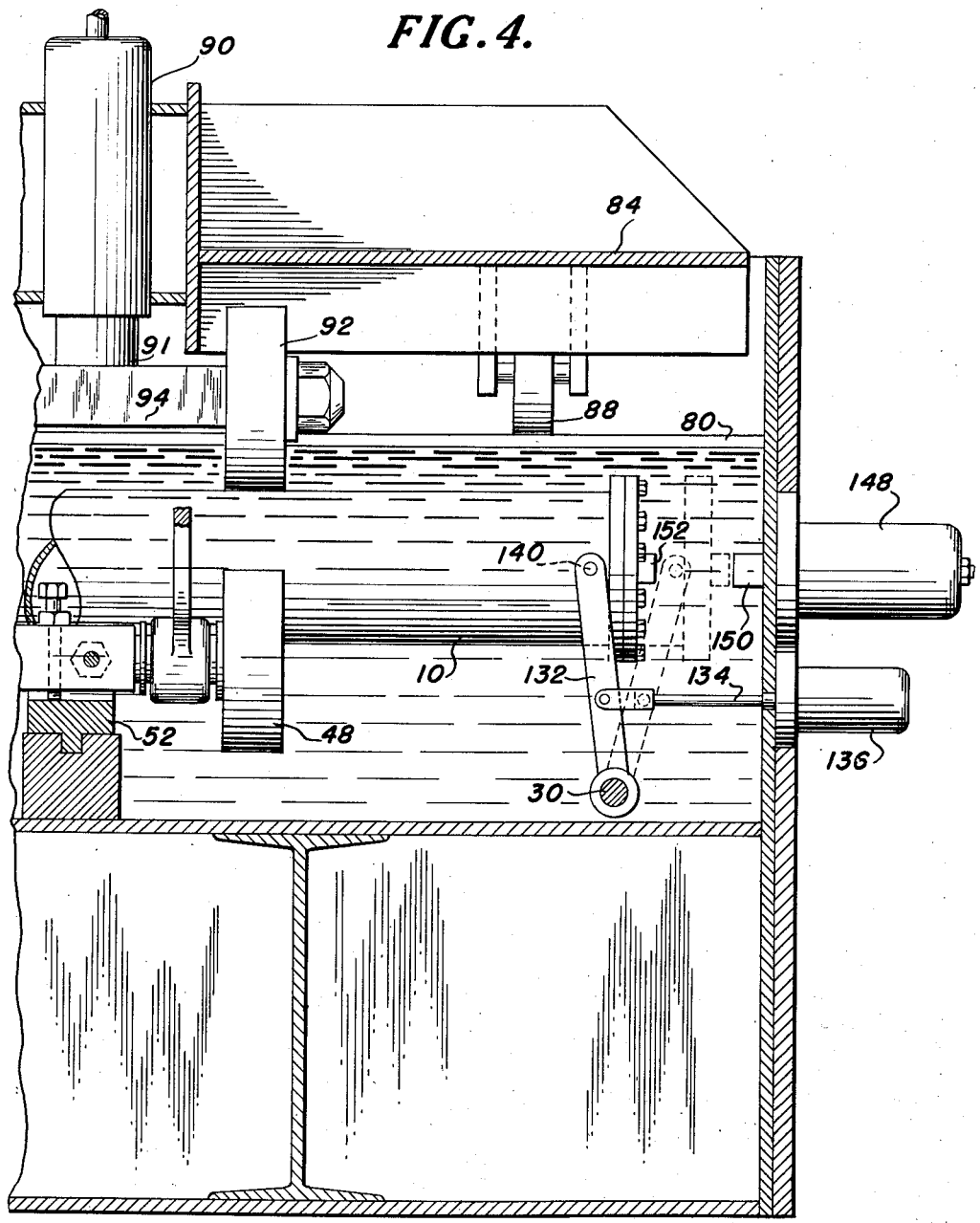

May 7, 1957  R. W. KURTZ  2,790,997
CASTING APPARATUS
Filed June 23, 1952  5 Sheets-Sheet 5
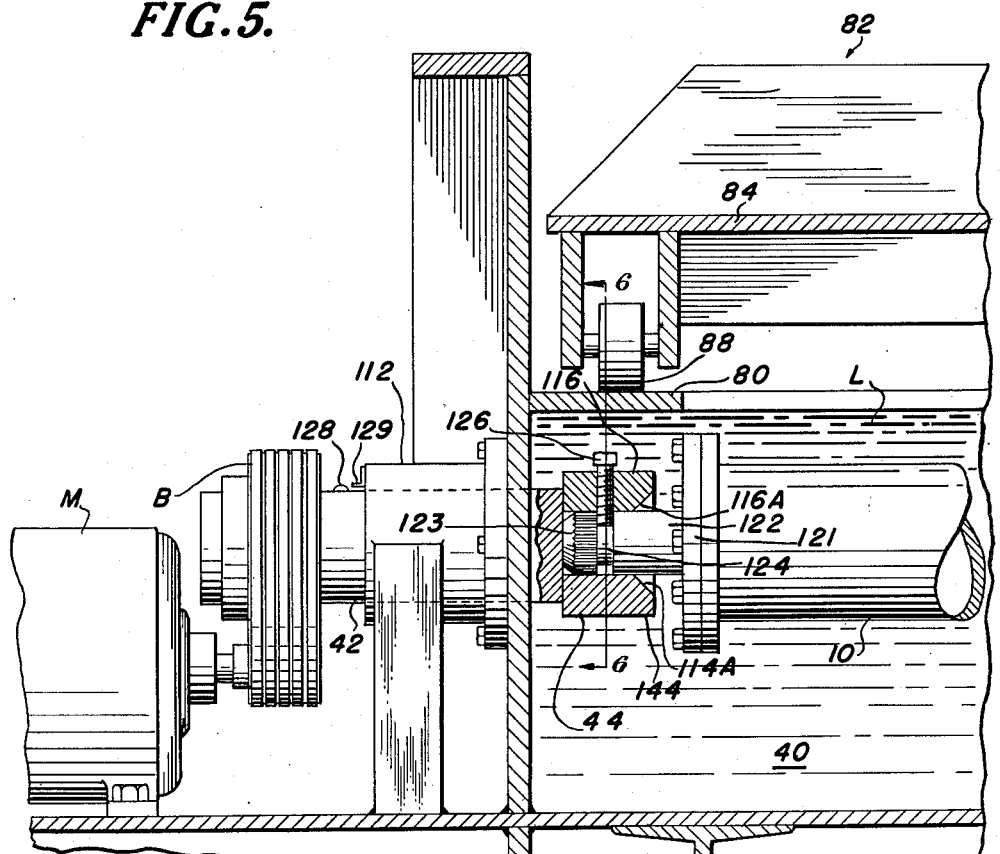
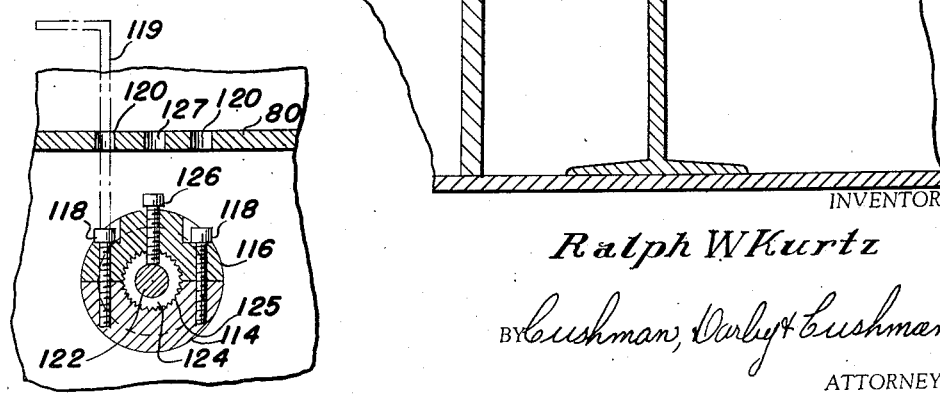
INVENTOR
Ralph W Kurtz
BY Cushman, Darby & Cushman
ATTORNEYS

United States Patent Office 2,790,997
Patented May 7, 1957

2,790,997

CASTING APPARATUS

Ralph W. Kurtz, Coshocton, Ohio, assignor to H. D. Boggs Company, Ltd., Omaha, Nebr., a limited partnership Application June 23, 1952, Serial No. 295,002

7 Claims. (Cl. 18—26)

This invention relates to the centrifugal casting of plastic tubular articles such as fiber reinforced plastic pipe.

In the copending applications of Herbert D. Boggs, Serial Nos. 200,193, filed December 11, 1950, and 264,976, filed January 4, 1952, and assigned to the assignee of the present invention, there are described and claimed methods and apparatus for the centrifugal casting of plastic pipe and analogous tubular articles wherein tubular molds are spun to generate centrifugal forces while heat is applied to the mold and the contents thereof. In the practice of the inventions of the just mentioned applications, it has been discovered that some improvement may be had in the manner of heating the molds while the spinning process is going on, to provide more uniform heat transfer. Where heat is applied to the molds by open flames, as in the above mentioned Boggs applications, it has been found that the heat transfer is not always uniform, resulting in some overly hot areas of the mold and some overly cool areas of the mold. For example, where the supporting rollers ride on the mold, some cool spots have been detected, and the pipe within the mold at such points is likely to be inferior in quality.

By the present invention a uniform heat transfer into the mold and the contents thereof is attained by the immersion of the mold in a bath of liquid maintained at predetermined desired temperatures. It has been found that the immersion of the mold within the liquid as the mold is rotated uniformly applies heat thereto, since the heated liquid reaches every part of the mold surface in substantially equal proportion. The basic method according to this invention therefore relates to immersing a tubular mold containing the plastics to be cast in a bath of heated liquid and spinning the mold while so immersed.

Apparatus for carrying out the just mentioned method is also part of this invention and basically comprises a container or tank in which molds may be positioned for immersion in heated liquid contained in the tank. Drive means are provided for spinning the mold in its position in the tank and means are provided either in conjunction with the container or in a circulatory pumping system for maintaining the heated liquid in the container.

It is therefore a primary object of this invention to provide methods and apparatus for uniformly applying heat to a spinning mold for the purposes of carrying out the centrifugal casting of plastic articles.

It is a further object of this invention to provide improved apparatus for receiving and spinning an elongated mold while immersed in a heated liquid.

It is a further object of this invention to provide apparatus for spinning a mold for centrifugal casting in which a mold may be lowered into position in a container, automatically advanced into engagement with mold rotating or spinning means, and subsequently retracted from said engagement and lifted clear of the container.

Further objects of the invention will be hereinafter pointed out or will be clear from the herein specification and the appended claims.

One exemplary embodiment of the apparatus for carrying out the invention will be described in detail below, but with no limitation thereto being intended.

The invention may be best understood with reference to the accompanying drawings in which:

Figure 1 is a schematic side elevational view partly in section of an exemplary embodiment of apparatus according to the invention.

Figure 2 is a fragmentary top plan view, somewhat enlarged, of the right-hand end of the apparatus as shown in Figure 1.

Figure 3 is a sectional view taken approximately along the line 3—3 of Figure 2.

Figure 4 is a sectional view taken substantially along the line 4—4 of Figure 2.

Figure 5 is a side elevational view partly in section of the left-hand end of the apparatus shown in Figure 1.

Figure 6 is a detail sectional view taken along the line 6—6 of Figure 5, and

Figure 7 is an end view of the left-hand end of the apparatus shown in Figure 1.

Referring first to Figures 1 and 3 for a general description of the apparatus, there is provided a tank 40 through the left-hand end of which as shown in Figure 1 extends a mold spinning or driving spindle 42 which carried at its inner end a drive coupling 44 for engaging an elongated tubular mold 10. The mold 10, which may be, for example, as much as 20 or more feet long and of the required internal diameter, is mounted upon sets of rollers 48, the rollers 48 being arranged in pairs longitudinally along the mold, each pair having a common shaft 50 which may be square in cross-section and held toward the bottom of the tank in slidable bearings 52. The ends of the square shafts 50 may be round to accommodate the rollers 48 which are mounted thereon with antifriction bearings.

Referring particularly to Figure 3, it will be observed that the shafts 50 are supported from the sides of the tank 40 by means of links 54 having slotted pivotal connections at 55. As an alternate arrangement, the slots in links 54 may instead be simple apertures just larger than the pivot pins. Adjustment bolts 56 are provided for adjusting the height of the rollers 48, and adjustment bolts 57 are provided for adjusting the horizontal position of the rollers 48, as required for aligning molds 10 of changeable diameters. To prevent the shafts 50 from slipping off the lower faces of the slide bearings 52 when no mold 10 is in place, small abutments 56' may be provided to engage the lower extremities of adjustment bolts 56.

Referring to Figure 1, one complete set of the rollers 48 is illustrated. However, it will be understood that in the particular embodiment shown in Figure 1, an additional set of the rollers and supporting gear will be provided toward the right-hand end, and as the molds may be extremely long, additional sets of similar rollers may be provided for within the concept of the present invention.

From the apparatus as thus far described, it will be apparent that the molds 10 will rest upon and be carried for rotational movement by the rollers 48. It will be noted from the drawings that the rollers 48 tangentially engage the mold at points spaced apart approximately 120° on the underside of the mold. This positional engagement of the mold with the rollers 48 will cause the rollers to be forced downwardly and outwardly so that the shafts 50 through the intermediate agency of the adjusting bolts 56 and 57 will seat firmly in the slide bearings 52. The rollers 48 are in all respects idler rollers for providing an under support for the mold 10.

It will understood that the 120° spacing of the rollers 48, while preferred, is not critical and other arrangements, possibly involving more than two rollers, are within the concept of the invention.

A series of gas burners or the like 70 is disposed beneath the lower surface of the tank 40, and as may be best observed in Figure 3, an effluent duct 72 is provided to serve as a flue for the spent gases from the burners 70. These gases may be further taken from duct 72 through a conduit 74 and then through a manifold (not shown) to any convenient location for disposing of the gases of the outside of the room in which the apparatus is located.

As has been indicated previously, a liquid will be retained in the tank 40 to a level L which will be above the top tangential point of the mold 10 when the latter is in position resting on the rollers 48. It will be appreciated from the apparatus as thus far described that the burners 70 will serve to heat the liquid to a temperature required to heat the contents of the mold to the desired amount.

Just above the liquid level line L in the tank there is provided a shelf 80 extending completely around the tank. This shelf constitutes a support for a cover structure 82 for the tank, which will now be described.

As best shown in cross-section in Figure 3, the cover structure 82 comprises a plate 84 having a rectangular box siding 86 extending thereabout and of a size to fit between the side walls 40a and 40b of the tank 40 and of a length to be accommodated between the ends of the tank. A plurality of rollers 88 are carried upon the lower edge margins of the cover and these rollers serve as antifriction guides for the cover structure 82 as the latter is lowered into position within the tank, within which it will be lowered until the rollers 88 engage the shelves 80.

At intervals along the cover structure there are provided pneumatic cylinders 90 having pistons (not shown) and piston rods 91 upon the lower extremities of which are carried square shafts 94 which, in turn, support overhead idler rollers 92.

From the foregoing description it will be clear that the overhead idler rollers 92 are positioned to engage the mold 10 and force same downwardly against the rollers 48. The sets of rollers 92 and 48 are preferably arranged to lie substantially in the same vertical plane, so that no bending moments are applied to the mold 10.

The pneumatic cylinders 90 are fixedly attached to the cover structure and the square shafts 94 are confined within limits to the cover structure by means of heavy duty bolts 96 (Fig. 1) having nuts positioned thereon to permit some downward movement of the shafts 94 relative to the cover structure under the action of the piston rods 91.

The dimensions of the various parts, as appear in the drawings, are such that when the cover structure is lowered into the top of the container after the mold is in position on the rollers 48, the overhead idler rollers 92 engage the mold at the topmost tangential point before the rollers 88 become seated upon the shelf 80 (assuming that the piston rods 91 are extended downwardly), so that the assembly comprising the rollers 92 and shaft 94 is raised upwardly as shown in Figure 1 a distance necessary for the rollers 88 to seat on the shelf 80. This movement causes the nuts on the bolts 96 to be raised above the cover structure and the pistons of the air cylinders 90 are afforded a corresponding upward movement, which may be resisted by an amount of air pressure up to the equivalent of the weight of the cover. An air line 100 may connect the several pistons 90 and thus afford a hold-down force which may be regulated to the size and weight of the mold in use. It will furthermore be appreciated that the forcing of the shafts 94 downwardly by virtue of air pressure, rather than direct connections with the cover structure, permits an equalization of forces at the rollers 92, without resort to close tolerances in the fabrication of the cover structure and the shelf 80 on the tank structure.

As may be best observed in Figure 1 it is preferable that the mold supporting assemblies be mounted along the tank in such a manner as to provide a substantial overhang of the mold 10 at the driving end. A sufficient flexibility is thus provided in the overhanging mold section, so that misalignment between the drive center and mold center (to be described) may be accommodated. Even though there may be some small deflection of the mold, so long as the resulting spin is about the true axis of the mold no harmful vibrations will ensue.

Reference will now be made in detail to the drive connection shown at the left-hand end of Figure 1. Referring to Figures 5 and 6, the drive spindle 42 projects through the end wall of the tank through a watertight bearing 112 and accommodates at its inner end the mold coupling 44 which is made in two halves. One half 114 is integral with or at least permanently fastened to the inner end of the drive spindle 42. The second half designated 116 is removable from the lower half by means of screws 118 which may be of the type formed with a hollow hexagonal socket in the head for the accommodation of a socket wrench 119 as shown in Figure 6.

The shelf 80 at the area overlying the bolts 118 may be provided with openings 120 for the introduction of the socket wrench 119 for adjusting the bolts.

Continuing to refer to Figure 5, the coupling parts 114 and 116 are formed to provide bevelled portions 114a and 116a, these portions being provided to permit easy insertion of the mold cap into the coupling. The mold cap comprises a flange portion 121 and an axially extending stud 122, the latter having a rounded or tapered end 123 and a circumferential groove 124. As will be described more fully below, a mold 10 equipped with the cap is lowered into position in the container 40 so that the stud 122 is to the right of the coupling as shown in Figure 5. Subsequently the mold is shifted longitudinally so that the stud 122 is run into the coupling 44, the bolts 118 being loosened at the time to permit the coupling part 116 to ride upwardly from coupling part 114, so that no binding on stud 122 occurs. While the previously mentioned rollers 48 will be pre-adjusted to substantially align the mold 10 with the coupling member 44 so that theoretically the stud 122 is precisely aligned with the central opening in coupling 44, nevertheless there may be some flexing of the mold, or other misalignment, but this can be adequately taken care of by the bevelled portions 114a and 116a cooperating with the bevelled end 123 of stud 122. That is, even if there is some misalignment the bevelled parts will cause the mold to flex slightly so that the parts are interengaged. As has been mentioned hereinabove, some slight deflections of the mold will not introduce any serious difficulties.

After the mold has been moved so that stud 122 enters the coupling 44, the bolts 118 may be tightened to provide a firm engagement for transmitting torque from the driving spindle 42 to the mold 40. Preferably, at least part 114 of the coupling and the stud 122 may be splined as designated at 125 to provide a positive torque engagement when bolts 118 are tightened. If the splines are relatively small and in sufficient number, they will easily mate and there will be no need to index the position of the mold with the position of the coupling.

After the stud 122 is in place in the coupling and the bolts 118 tightened, a third bolt 126 extending through the coupling part 116 may be tightened with the wrench 119 through an opening 127 in shelf 80 so that the lower end of the bolt seats in the previously mentioned circumferential groove 124. Bolt 126 is provided to prevent longitudinal movement of the stud 122 out of the coupling when such movement is not desired.

Since the coupling 44 may be beneath the surface L of the heated liquid, to facilitate tightening of the bolts 118 the driving spindle 42 is provided with an index point in the form of a screw head 128 arranged to cooperate with an index pointer 129 on the bearing 112 to show the operator when the bolt heads 118 and 126 are aligned with the openings 120 and 127 in the shelf 80.

A motor M is provided to drive the spindle 42 through the agency of a multi-sheave V-belt arrangement designated as B. Preferably the motor M should be capable of rotation at different speeds, to accommodate the various casting techniques as fully described in the above mentioned Boggs applications.

As mentioned hereinabove, molds are placed in the container 40 by lowering same through the top of the container when the cover structure carrying the rollers 92 is removed. As will be apparent from Figure 5, it is necessary to lower the mold into the container so that the stud 122 is to the right of the coupling 44 and thereafter it is necessary to shift the mold longitudinally until the stud 122 is engaged in the coupling. An arrangement for accomplishing this shifting will now be explained with reference to Figures 2 and 4, this arrangement also serving to retract the mold to remove the stud 122 from the coupling 44. As shown in these figures, there is provided across the tank 40 a rock shaft 30 which carries a pair of crank arms 132 in fixed relation thereto. Fixed to one of the arms 132 is a piston rod 134 extending into a cylinder 136. The cylinder 136 may be of the double-acting type, although it is only required in the present instance that the piston in the cylinder be arranged to forcibly retract the piston rod 134 into the cylinder 136 for reasons which will become apparent. Mounted at the upper ends of arms 132 in proximity to the flange on the end of mold 10 are fingers 140 projecting inwardly in such fashion that when the piston rod 134 moves to the right as viewed in Figures 2 and 4, the fingers 140 will engage the mold flange and cause the mold to be moved to the right in a direction which will disengage the stud 122 from the coupling 44. The retracted position of the mold and the arms 132 is shown in chain line in Figures 2 and 4.

The reverse movement of the mold is effected by means of a cylinder 148 equipped with a piston (not shown) and having a piston rod 150 extending therefrom and arranged centrally of the mold position so that the end of the piston rod 150 may abut against a short stud 152 extending from the mold cap at this end of the mold. Again the cylinder 148 may be of the double-acting type, although in this case it is only necessary that a positive force be applied to the left as viewed in Figures 2 and 4. The control of air or liquid under pressure to cylinders 136 and 148 may be under the control of manually operated valves, or an automatic timing system, as will be well understood by those skilled in the art.

A further advantage of the construction is that expansion and contraction of the mold may take place unhampered, since the mold is longitudinally fixed only at the driving end.

Referring now to Figures 1 and 7 in addition to Figures 2-5, there may be provided in the side plates 86 of the cover structure 82 suitable eyes 154 for receiving bails 156 which may be employed in connection with an overhead travelling hoist arrangement 158 of conventional design to lift the cover structure free of the container 40. When the cover structure has been removed, mold clamping tongs 160 as shown in Figure 7 may be lowered into the container 40 to grasp the mold and raise the latter from the container.

As will now be apparent, with no mold in the container 40 the cylinder 148 may be initially conditioned to retract the piston rod 150 to the right as shown in Figure 4 and the cylinder 136 conditioned to move the arms 132 to the left as shown in Figure 4. Then, a mold 10 is lowered into the container 40 to occupy substantially the position shown in chain line in Figures 2 and 4. As soon as the mold is rested on the rollers 48, the cylinder 148 may be activated so that its piston rod 150 moves the mold to the left to engage the stud 122 in the coupling 44 as has been previously described.

At the completion of the spinning operation, the cylinder 136 may be activated to cause the arms 132 to move to the right as shown in Figures 2 and 4 to again establish the mold in the chain line position of Figures 2 and 4 so that it may now be lifted from the container.

The container 40 is preferably jacketed with an insulating material I at the sides and also in the cover structure above the plate 84 so that a minimum of heat is exchanged to the outside atmosphere, thereby conserving fuel and also better regulating the temperature of the liquid.

Control of the temperature of the liquid in the container 40 may be effected by any convenient means and no particular limitation thereto is intended. The least complicated manner of handling the liquid will be to simply fill the container 40 to the level L and apply heat to the bottom of the container by means of the burners 70. Temperature responsive means of conventional variety may be immersed at convenient points in the bath and serve to automatically control the burner 70 either in on-off manner or regulate the rate of combustion. However, it is also within the scope of this invention to provide liquid conduit means such as 162 in Figure 7 which may interconnect with auxiliary tank means and circulating pump means. It is envisioned that in one embodiment liquid may be heated elsewhere and circulated through tank 40 by means of said circulating pump arrangement. It is also contemplated that, where it is deemed desirable or necessary to lower the level L beneath the mold for any reason, an auxiliary tank may be provided with pump means to exchange the liquid thereto from the container 40. Circulating pump means and auxiliary tank means will also permit the rapid changing of the temperature of the liquid as may be required in the various steps of the casting procedure.

It has been found that a quantity of soluble oil may be intermixed with water, when water is used as the heat transfer medium, to adequately lubricate the various bearings associated with the rollers and driving spindles. Moreover, it is within the scope of this invention to employ a suitable oil as the heat transfer liquid, this also providing for the lubrication of the various bearings.

From the foregoing it will be apparent that there is provided by the present invention a novel method and apparatus for the uniform and controlled transfer of heat into a centrifugal casting mold and the contents thereof. This method and apparatus serve to greatly improve the quality of plastic pipe, and particularly fiber reinforced plastic pipe of the type described and claimed in the above cited patent applications of Herbert D. Boggs.

What is claimed is:

1. Apparatus for the centrifugal casting of plastic articles comprising, a container for retaining a body of liquid, means for rotatably mounting an elongated tubular mold within the container, means for rotating the mold about its longitudinal axis while supported in said mounting means, the surface of the liquid in the container being at a level sufficient to immerse the mold in the liquid, means to maintain the liquid at a predetermined temperature to create heat transfer from the liquid into the mold and the contents thereof, and means for coupling and uncoupling the mold to and from said rotating means while the mold is totally immersed in the liquid.

2. Apparatus for the centrifugal casting of plastic articles comprising, a container for retaining a body of liquid, means for rotatably mounting an elongated tubular mold within the container, means for rotating the mold about its longitudinal axis while supported in said mounting means, the surface of the liquid in the container being at a level sufficient to imerse the mold in the liquid, means to maintain the liquid at a predetermined temperature to create heat transfer from the liquid into the mold and the contents thereof, means for coupling and uncoupling the mold to and from said rotating means while the mold is totally immersed in the liquid, said coupling and uncoupling means including means for advancing a mold in the direction of the longitudinal axis of the mold to engage the mold with the mold rotating means.

3. Apparatus for the centrifugal casting of plastic articles comprising, a container for retaining a body of liquid, means for rotatably mounting an elongated tubular mold within the container, means for rotating the mold about its longitudinal axis while supported in said mounting means, the surface of the liquid in the container being at a level sufficient to immerse the mold in the liquid, means to maintain the liquid at a predetermined temperature to create heat transfer from the liquid into the mold and the contents thereof, means for coupling and uncoupling the mold to and from said rotating means while the mold is totally immersed in the liquid, said coupling and uncoupling means including means for retracting the mold in the direction of the longitudinal axis of the mold out of engagement with the mold rotating means.

4. Apparatus for the centrifugal casting of plastic articles comprising, a container for retaining a body of liquid, means for rotatably mounting an elongated tubular mold within the container, means for rotating the mold about its longitudinal axis while supported in said mounting means, the surface of the liquid in the container being at a level sufficient to immerse the mold in the liquid, means to maintain the liquid at a predetermined temperature to create heat transfer from the liquid into the mold and the contents thereof, means for coupling and uncoupling the mold to and from said rotating means while the mold is totally immersed in the liquid, said coupling and uncoupling means including selectively operable means for advancing a mold in the direction of the longitudinal axis of the mold to engage the mold with the mold rotating means, and also including selectively operable means for retracting the mold in the direction of the longitudinal axis of the mold out of engagement with the mold rotating means.

5. Apparatus as in claim 1 wherein the means for rotatably mounting the mold comprises a plurality of idler rollers to support the molds for rotation thereon at tangential contact points, the idler rollers being supported on arms pivotally attached to the container and wherein screw-threaded adjustment means are provided for independently adjusting the lateral and vertical positions of the rollers.

6. Apparatus for the centrifugal casting of plastic articles comprising, a container for retaining a body of liquid, means for rotatably supporting an elongated tubular mold within the container, means for rotating the mold about its longitudinal axis while supported on said supporting means, the surface of the liquid in the container being at a level sufficient to immerse the mold in the liquid, means for maintaining the liquid at a predetermined temperature to create heat transfer from the liquid into the mold and the contents thereof, means for coupling and uncoupling the mold to and from said rotating means while the mold is totally immersed in the liquid, means for holding said mold down on said supporting means, said holding means comprising a plurality of rollers, a compressible-fluid operated piston means fixed to each of said rollers, each of said piston means being connected to a common source of compressible-fluid, whereby each of said rollers press against said mold with an equal force despite variance in the relative vertical locations of the mold and of each of said piston means.

7. Apparatus for the centrifugal casting of plastic articles comprising, a container for retaining a body of liquid, means for rotatably supporting an elongated tubular mold within the container, means for rotating the mold about its longitudinal axis while supported on said supporting means, the surface of the liquid in the container being at a level sufficient to immerse the mold in the liquid, means for maintaining the liquid at a predetermined temperature to create heat transfer from the liquid into the mold and the contents thereof, means normally positioned about and adjacent the mold to hold the mold down on said supporting means, said hold down means being removably mounted to allow vertical movement of the mold into and out of said container, means to maintain said hold down means in a position above and adjacent said mold to bear against said mold, said hold down means comprising a plurality of rollers, a compressible-fluid operated piston means fixed to each of said rollers, each of said piston means being connected to a common source of compressible-fluid, whereby each of said rollers press against said mold with an equal force despite variance in the relative vertical locations of the mold and of each of said piston means.

References Cited in the file of this patent
UNITED STATES PATENTS

| | | |
|---|---|---|
| 1,199,997 | Lienesch | Oct. 3, 1916 |
| 1,303,889 | Gruenfeld | May 20, 1919 |
| 1,663,896 | Barkschat | Mar. 27, 1928 |
| 1,703,970 | Thorsen | Mar. 5, 1929 |
| 1,783,094 | Moore et al. | Nov. 25, 1930 |
| 1,792,813 | Campbell | Feb. 17, 1931 |
| 1,832,066 | Von Webern | Nov. 17, 1931 |
| 1,992,739 | Carrington | Feb. 26, 1935 |
| 2,278,858 | Fields | Apr. 7, 1942 |
| 2,455,248 | Hagen et al. | Nov. 30, 1948 |
| 2,701,403 | Chanlund | Feb. 8, 1955 |